United States Patent [19]

Sato et al.

[11] Patent Number: 5,326,634
[45] Date of Patent: Jul. 5, 1994

[54] ADHESIVE TAPE

[75] Inventors: Kunihiro Sato, Ishinomaki; Kazunori Oride, Tokyo; Keiji Yoshimura, Urayasu; Hiroyuki Yuasa, Syonan, all of Japan

[73] Assignees: Moby Dick Inc.; Freund Industrial Co., Ltd.; Yugen Kaisya Fujiken, all of Tokyo, Japan

[21] Appl. No.: 921,370

[22] Filed: Jul. 28, 1992

Related U.S. Application Data

[63] Continuation of Ser. No. 524,642, May 16, 1990, abandoned.

[30] Foreign Application Priority Data

May 18, 1989 [JP] Japan .................................. 1-124794

[51] Int. Cl.$^5$ .............................................. C09J 7/02
[52] U.S. Cl. ........................... 428/314.4; 428/317.1; 428/317.3; 428/317.7; 428/343; 428/355
[58] Field of Search .................. 428/343, 317.1, 317.3, 428/355, 356, 317.7, 351, 349, 314.4

[56] References Cited

U.S. PATENT DOCUMENTS

| | | | |
|---|---|---|---|
| 2,570,829 | 10/1951 | Maxey | 428/349 |
| 2,850,406 | 9/1958 | Gold | 428/349 |
| 2,969,143 | 1/1961 | DeBell | 428/355 |
| 3,197,326 | 7/1965 | Webber | 428/355 |
| 3,464,543 | 9/1969 | Kwiatanowski | 428/355 |
| 4,273,827 | 6/1981 | Sweeney | 428/317.3 |
| 4,397,906 | 8/1983 | Nakagawa | 428/355 |
| 4,497,926 | 2/1985 | Toy | 428/343 |
| 4,524,104 | 6/1985 | Hagio | 428/355 |
| 4,588,637 | 5/1986 | Chiu | 428/355 |
| 4,654,257 | 3/1987 | Murachi | 428/317.7 |
| 4,668,576 | 5/1987 | Yotsuya | 428/356 |
| 4,943,461 | 7/1990 | Karim | 428/355 |
| 5,093,203 | 3/1992 | Mowrey | 428/462 |

FOREIGN PATENT DOCUMENTS 46-01278  1/1971  Japan .................................. 428/349

*Primary Examiner*—Jenna L. Davis
*Attorney, Agent, or Firm*—Kane, Dalsimer, Sullivan, Kurucz, Levy, Eisele and Richard

[57] ABSTRACT

An adhesive tape which comprises a tape base material having stretchability and an adhesive mainly consists of a rubber having halogen or the nitrile groups in the molecule and having unsaturated bonds in the main chain, or added therein a second rubber having halogen in the molecule and having no unsaturated bond in the main chain and/or a blocked polyisocyanate, the adhesive being coated on a surface of the tape base material. This adhesive tape shows firm adhesion to almost all the industrial rubber, particularly to a vulcanized rubber and also has high elasticity of the coated film so that, by using this adhesive tape, sporting goods made of rubber having good stretchability can be produced without troublesome sewing and sealing procedures.

8 Claims, No Drawings

ADHESIVE TAPE

This is a continuation of copending application(s) Ser. No. 07/524,642 filed on May 16, 1990 now abandoned.

BACKGROUND OF THE INVENTION

1. Field of the Invention

This invention relates to an adhesive tape, more particularly to an adhesive tape which can be suitably used for adhering materials having large stretchability such as vulcanized rubber to each other.

2. Related Art Statement

Sporting goods, such as a wet suit or a dry suit, made of rubber have been prepared by cutting raw sheet of vulcanized rubber to a predetermined shape and then sewing cut pieces with each other. Also, in the case where very high airtight property or waterproof property is required, after sewing the cut pieces, sewed portions are then further sealed with an adhesive and the like. However, the above procedure of sewing or sealing requires much labor so that a production cost of the sporting goods increases. Therefore, in recent years, technique wherein cut pieces are not sewed but adhered by using an adhesive tape has been utilized. As an adhesive to be used in this kind of adhesive tapes, there have been known a chloroprene type adhesive, to which a curing agent such as isocyanate is added; an isocyanate type adhesive; a hot melt type adhesive; and the like.

However, vulcanized rubber has a disadvantage that it is usually poor in adhesiveness for those conventional adhesive tapes. This is because additives included in vulcanized rubber such as stearic acid, wax or an antioxidant are gradually migrated to the surface layer thereof whereby adhesive force of the adhesive is decreased. Further, stretchability of the adhesive is poor so that it cannot follow to stretching or bending of vulcanized rubber. Thus, in the case of sporting goods made of rubber which has particularly high stretchability, such as a wet suit or a dry suit, adhesive surface becomes gradually aged and cracks are generated. And thus, there is a problem that water penetrates through adhered portion whereby lifetime of the product becomes markedly short. From the above circumstances, there have been desired to provide an adhesive tape having firm adhesion to vulcanized rubber as well as high elasticity of a coated film.

SUMMARY OF THE INVENTION

An object of the present invention is to provide an adhesive tape having a firm adhesion to vulcanized rubber.

Another object of the invention is to provide an adhesive tape having high elasticity of coated film.

The above and other objects and novel features of the present invention will become more evident by the following detailed description and Examples.

The adhesive tape of the present invention comprises a base material having high stretchability such as vulcanized rubber and an adhesive coated on the surface of the base. The adhesive of the invention has a composition selected from either one of the following (1) to (4).

(1) An adhesive mainly consisting of a rubber having halogen or the nitrile groups in the molecule and having unsaturated bonds in the main chain.

(2) An adhesive mainly consisting of a rubber which comprises (a) a rubber having halogen or the nitrile groups in the molecule and unsaturated bonds in the main chain, and (b) 0.1 to 3 parts by weight of a blocked polyisocyanate based on 1 part by weight of the rubber (a).

(3) An adhesive mainly consisting of a rubber which comprises (a) a first rubber having halogen or the nitrile groups in the molecule and unsaturated bonds in the main chain, and (b) 0.25 to 1 part by weight of a second rubber having halogen in the molecule and no unsaturated bond in the main chain, the ratio being to 1 part by weight of the first rubber.

(4) An adhesive mainly consisting of a rubber which comprises (a) a first rubber having halogen or the nitrile groups in the molecule and unsaturated bonds in the main chain, (b) 0.05 to 10 parts by weight of a second rubber having halogen in the molecule and no unsaturated bond in the main chain, and (c) 0.1 to 3 parts by weight of a blocked polyisocyanate, ratios being based on 1 part by weight of the first rubber.

Each of the adhesive tapes of the present invention comprising the above constitution (1), (2), (3) or (4) has firm adhesion to vulcanized rubber and the elasticity of the coated film is extremely high. Accordingly, the adhesive tapes are optimally used for adhering base materials having high stretchability such as rubber with each other.

By applying the adhesive tape of the present invention to sewing portions of sporting goods made of rubber which require high stretchability, airtight property and waterproof property, products' lifetime can be markedly enhanced. Also, no sewing procedure which accompanies a lot of labor is needed and production time can be shortened whereby a production cost of sporting goods can be diminished.

DETAILED DESCRIPTION OF THE PREFERRED EMBODIMENTS

In an adhesive tape of the invention, a rubber (first rubber) which is a main component of an adhesive is a rubber having halogen or the nitrile groups in the molecule and also having unsaturated bonds in the main chain. Among these rubbers, a rubber having halogen in the molecule can be exemplified by a rubber containing chlorine or bromine as halogen such as chloroprene rubber (CR), chlorinated isobutylene-isopren rubber (Cl-IIR), brominated isobutylene-isopren rubber (Br-IIR). In the case of chloroprene rubber, those having high crystallinity are particularly preferred. On the other hand, a rubber having the nitrile groups in the molecule can be exemplified by nitrile rubber (NBR).

As the second rubber having halogen in the molecule and having no unsaturated bond in the main chain, chlorinated natural rubber (Cl-NR), chlorinated polyethylene (Cl-PE), chlorinated polypropylene (Cl-PP), epichlorohydrin rubber (CO, ECO), chlorosulfonated polyethylene (CSM) can be exemplified.

The blocked polyisocyanate having a structure in which a polyisocyanate such as diisocyanate or triisocyanate is blocked with organic compounds containing an active hydrogen such as acetylacetone, acetoacetic ester, malonate and the like. This blocked polyisocyanate dissociates and regenerates a polyisocyanate by heating. As dissociation temperature, a temperature which does not cause heat deterioration of a material to be coated is desirable. When the material is rubber, a dissociation temperature not exceeding 140° C., preferably 130° C. or lower, is suitable. Further, it is desirable that a blocked polyisocyanate does not dissociate at room temperature, preferably at 60° C. or lower. However, a blocked polyisocyanate having a high dissociation temperature can be used by adding a basic substance such as amine to decrease the dissociation temperature to 140° C. or lower. On the other hand, as a polyisocyanate, any one can be used, though aliphatic type or allcyclic type ones are preferred when yellow fading of the coated film is to be prevented.

For preparing the adhesive mainly consisting of the above first rubber, it can be prepared only by adding a usual organic solvent such as benzene, toluene, xylene, chlorobenzene, carbon tetrachloride and the like to the first rubber and then kneading them by using, for example, a rubber roll.

In the case of the adhesive in which a blocked polyisocyanate is added to the above first rubber, it can be obtained by mixing the first rubber with the blocked polyisocyanate and the above-mentioned organic solvent, and then kneading them by using, for example, a rubber roll. The ratio of the blocked polyisocyanate varies preferably 0.1 to 3 parts by weight, more preferably 0.2 to 1 part by weight to 1 part by weight of the first rubber. If the ratio of the blocked polyisocyanate is less than the above value, an adhesion is lowered and if it is in excess of the above, elasticity of the coating film is lowered.

As the first rubber and the second rubber have good compatibility with each other, in preparing an adhesive wherein the second rubber is mixed into the first rubber, a colorless and transparent viscous adhesive can easily be obtained only by mixing the first and second rubbers and the above organic solvent and then kneading them by using, for example, a rubber roll. A component ratio of this adhesive varies preferably 0.25 to 1 part by weight of the second rubber to 1 part by weight of the first rubber. If the ratio of the first rubber is less than the above value, elasticity of the coating film is lowered and if it is in excess of the above, an adhesion is lowered.

In preparing an adhesive wherein the second rubber and a blocked polyisocyanate are mixed to the first rubber, 0.05 to 10 parts by weight of the second rubber and 0.1 to 3 parts by weight of the blocked polyisocyanate are preferably mixed to 1 part by weight of the first rubber. In this case, if the ratio of the second rubber and the blocked polyisocyanate are in excess of the above value, elasticity of the coating film is lowered and if it is less than the above, an adhesion becomes lower.

The adhesive thus prepared has high stability so that it is possible to store for a long period of time at room temperature, and there is no fear of increasing viscosity nor lowering in adhesive force even when allowed to stand for one year or more whereby handling thereof is extremely convenient. Also, a vulcanizing agent such as zinc oxide or magnesium oxide, or a vulcanizing accelerator may be added to the adhesive in order to improve storage stability thereof, and various additives which are usually used for rubber such as antioxidants, UV absorbers, plasticizers, lubricants, etc. may be added without any problem. Particularly, when improvement in stability under exposure to light is desired, it is effective to add a vulcanizing accelerator such as zinc butyl xanthate thereto. Also, the adhesive can be desirably colored by adding a pigment or a dye.

The adhesive tape of the present invention comprises the adhesive described above and a tape base material having stretchability, the adhesive being placed on one side of the tape base by the conventional method. The base material for a tape having stretchability can be exemplified by chloroprene rubber (CR) and the like, and when it is required particularly high stretchability, a sponge rubber having closed-cells is suitable.

The adhesive tape of the present invention has firm adhesion to almost all the industrial rubbers including not only natural rubber (NR) but also synthetic rubbers, and particularly, it shows firm adhesion to vulcanized rubber such as chloroprene rubber (CR), nitrile rubber (NBR) and styrene-butadiene rubber (SBR). As the coated film has also high elasticity, it is an optimum adhesive tape for production of sporting goods made of rubber having particularly high stretchability, such as a wet suit and a dry suit.

When the sporting goods made of rubber is prepared by using the adhesive tape of the present invention, after cutting a raw material such as vulcanized rubber to cut pieces of predetermined shapes, the adhesive tape of the present invention is pressed and bonded onto one side or both sides of portions to be joined of cut pieces and then dried at a normal temperature.

The adhesive tape of the present invention can be used not only to the vulcanized rubber but also to papers, synthetic papers, nonwoven fabrics, leathers, synthetic leathers, synthetic resins, and so on.

In the following, the present invention will be explained by referring to Examples, although the present invention is not limited by these Examples.

EXAMPLES (1) Preparation of an adhesive:

Adhesives Nos. 1 to 11 were prepared by mixing each components shown in Table 1 by a rubber roll.

Table 2 shows a manufacturer and a chemical name of each component in Table 1.

TABLE 1

| Component | Starting material | (Number in the table shows part(s) by weight) Adhesive | | | | | | | | | | |
|---|---|---|---|---|---|---|---|---|---|---|---|---|
| | | No. 1 | No. 2 | No. 3 | No. 4 | No. 5 | No. 6 | No. 7 | No. 8 | No. 9 | No. 10 | No. 11 |
| A | Neoprene AD | | 17 | | 14 | | | 18 | | | 12 | |
| (Note 1) | NIPOL 1031 | 13 | | | 12 | | | | 12 | 10 | | |
| | Denka Chloroprene A-90 | | | 14 | | | 20 | | | | | 21 |
| B | Adeka Chlorinated rubber CR-20 | | | | | 11 | | 2 | | | 13 | |
| (Note 2) | Adeka Chlorinated rubber CR-40 | 11 | | | 4 | | | | 10 | | | |
| | Adekaprene CP-2S | | 5 | 7 | | | | | | | | |
| | Adekaprene CE-305 | | | | | | 6 | 4 | | | | |
| C | Coronate 2513 | | | 10 | 10 | | | | | | | 10 |
| (Note 3) | LDI-2-phenyl-ethyl acetoacetate | | | | | | | | | 7 | | |
| Antioxidant | Nocrac NS-6 | 0.1 | 0.1 | 0.1 | 0.1 | 0.2 | 0.2 | 0.1 | 0.1 | 0.2 | 0.1 | 0.1 |
| Stabilizer | Epikote 828 | | 3 | | | | | 1 | | 3 | | |
| | EP 4100 | | | | 3 | 2 | | | | 2 | | |

TABLE 1-continued

| Component | Starting material | Adhesive (Number in the table shows part(s) by weight) | | | | | | | | | | |
|---|---|---|---|---|---|---|---|---|---|---|---|---|
| | | No. 1 | No. 2 | No. 3 | No. 4 | No. 5 | No. 6 | No. 7 | No. 8 | No. 9 | No. 10 | No. 11 |
| Plasticizer | Dioctylphthalate | 0.5 | 1 | 0.5 | 1 | 2 | 3 | 1.5 | 3 | 2 | 1 | 0.5 |
| Vulcanizing agent | Zinc oxide | | | | | | 1.5 | | | | | |
| | Magnesium oxide | | | | | | 1 | | | | | |
| Vulcanzing accelerator | Nocceler ZBX | | | | | | 1 | | | | | |
| Solvent | Toluene | * | * | * | * | * | 30 | * | * | * | * | * |
| | Xylene | 15 | | 10 | | | * | | | | | |
| | Methyl ethyl ketone | 20 | 20 | 15 | 10 | | | 15 | 20 | | 20 | 20 |
| Others | Cumaron-indene resin G-90 | | | | | | | 1 | 1.5 | | | |
| | Polyvinyl acetate resin | | | | | | | | 1 | | | |

Note 1 A: Rubber having halogen or the nitrile group in the molecule and having the unsaturated bonds in the main chain.
Note 2 B: Rubber having halogen and having no unsaturated bond in the main chain.
Note 3 C: Blocked polyisocyanate

TABLE 2

| Starting Material (Trade name) | Manufacturer (abbr. "Co., Ltd.") | Chemical Name |
|---|---|---|
| Neoprene AD | Dupont Showa Denko | Chloroprene rubber |
| NIPOL 1031 | Nippon Geon | Nitrile rubber |
| Denka chloroprene A-90 | Denka Kogyo | Chloroprene rubber |
| Adeka chlorinated rubber (CR-20, CR-40) | Asahi Denka Kogyo | Chlorinated rubber |
| Adekaprene CP-2S | Ditto | Chlorinated polypropylene |
| Adekaprene CE-305 | Ditto | Chloroinated polyethylene |
| Coronate 2513 | Nippon Polyurethane Industry | Blocked polyisocyanate |
| Nocrac NS-6 | Ouchi Shinko Chemical Industrial | 2,2-Methylenebis-(4-methyl-6-tert-butylphenol) |
| Epikote 828 | Yuka Shell Epoxy | Bisphenol A type epoxy resin |
| EP 4100 | Asahi Denka Kogyo | Ditto |
| Nocceler ZBX | Ouchi Shinko Chemical Industrial | Zinc butyl xanthate |
| G-90 | | Cumaron-indene resin |

In each of adhesives Nos. 1 to 11 in Table 1, a rubber (first rubber) having halogen or the nitrile groups in the molecule and having unsaturated bonds in the main chain was used in the form of a 20% solution dissolved in toluene and other components are mixed therein. Also, each of adhesives Nos. 1 to 11 was made 100 parts by weight in total by adding an organic solvent marked with "*" in the table. In the case of adhesive No. 6, zinc oxide and magnesium oxide were added after chloroprene rubber A-90 was kneaded, and, then, organic solvents were added and mixed.

(2) Preparation of adhesive tape:
Each of the above adhesives Nos. 1 to 11 was coated on one side of a tape base, which is a dry suit base made of closed-cell sponge of chloroprene and has thickness of 1.5 mm and width of 20 mm, to obtain an adhesive tape with a coated layer of about 30 μm thickness.

(3) Adhesive test:
i) Adhesive test-1
Two sheets of dry suit bases made of closed-cell sponge of chloroprene rubber and having length of 200 mm, breadth of 100 mm and thickness of 1.5 mm were prepared, then edges thereof with lengths of 200 mm were faced to be contacted with each other, and the two sheets were adhered by the above adhesive tape by hot press at 120° C. in such a manner that the adhesive tape is placed on a boundary line of the contact edges of two sheets.

ii) Adhesive test-2
Two sheets of dry suit bases made of closed-cell sponge of chlorosulfonated polyethylene rubber and having length of 200 mm, breadth of 100 mm and thickness of 1.5 mm were prepared, then edges thereof with lengths of 200 mm were faced to be contacted with each other, and the two sheets were adhered by the above adhesive tape by hot press at 120° C. in such a manner that the adhesive tape is placed on a boundary line of the contact edges of two sheets.

iii) Adhesive test-3
Two sheets of dry suit bases made of closed-cell sponge of chloroprene rubber laminated with jersey made of nylon, polyester or polyurethane and having length of 200 mm, breadth of 100 mm and thickness of 1.5 mm were prepared, then edges thereof with lengths of 200 mm were faced to be contacted with each other, and the two sheets were adhered by the above adhesive tape by hot press at 120° C. in such a manner that the adhesive tape is placed on a boundary line of the contact edges of two sheets.

iv) Adhesive test-4
Portions to be connected with each other, and after coating each of the above adhesives Nos. 1 to 11 to the portions, the portions to be connected were adhered by the above adhesive tape by hot press at 120° C. in such a manner that the adhesive tape is placed on a boundary line of the contact edges of two sheets. This dry suit product was wore for one season.

v) Comparative test-1
On one side of a dry suit base made of closed-cell sponge of chloroprene rubber and having thickness of 1.5 mm was coated with a conventional adhesive for rubber to obtain an adhesive tape having width of 20 mm with a coated layer of adhesive of about 30 μm thickness. Next, two sheets of dry suit base made of closed-cell sponge of chloroprene rubber and having length of 200 mm, breadth of 100 mm and thickness of 1.5 mm were prepared, then edges thereof with lengths of 200 mm were faced to be contacted with each other, and the two sheets were adhered by the above adhesive tape by hot press at 120° C. in such a manner that the adhesive tape is placed on a boundary line of the contact edges of two sheets.

vi) Comparative test-2

Portions to be connected of a dry suit product made of closed-cell sponge of chloroprene rubber and having thickness of 1.5 mm were faced to be contacted with each other, and after coating with the same conventional adhesive for rubber used in Comparative test-1 to the portions, the two sheets were adhered by the above adhesive tape by hot press at 120° C. in such a manner that the adhesive tape is placed on a boundary line of two portions. This dry suit product was wore for one season.

(4) Test results:

In Adhesive tests-1, 2 and 3, when the adhesive tape and the dry suit base were peeled off by hand, rupture of the material was caused when adhesive tapes coated either with adhesives Nos. 1 to 8 were used. Also, when adhesive tapes coated either with adhesives Nos. 9 to 11 were used, rupture of the material was caused at a part thereof and also rupture of the coating film of the adhesive was caused at a part thereof.

In Adhesive test-4, no water leakage was caused from the connected portions even after worn for one season.

In Comparative test-1, rupture of the material was caused at a part thereof and also peel off at an interface of the adhesive is caused at a part thereof.

In Comparative test-2, water leakage was caused during wearing due to deterioration of the coated film of the adhesive.

What is claimed is:

1. An adhesive heat sensitive tape for adhering to materials exhibiting relatively large degree of stretchability which comprises:
    a tape base material comprising a closed-cell chloroprene sponge rubber having stretchability, and
    an adhesive as a layer for adhering to said materials exhibiting relatively large degree of stretchability comprised of a first rubber having halogen atoms in a molecule thereof and having unsaturated bonds in main chains, the adhesive being coated on a surface of said tape base material.

2. An adhesive tape of claim 1 wherein the adhesive is further comprised of, based on 1 part by weight of the first rubber, 0.1 to 3 parts by weight of a blocked polyisocyanate.

3. An adhesive tape of claim 1 wherein the adhesive is further comprised of, based on 1 part by weight of the first rubber, 0.25 to 1 part by weight of a second rubber having a halogen atom in a molecule thereof and having no unsaturated bond in the main chain.

4. An adhesive heat sensitive tape for adhering to materials exhibiting relatively large degree of stretchability which comprises:
    a tape base material comprising a closed-cell sponge rubber having stretchability, and
    an adhesive as a layer for adhering to said materials exhibiting relatively large degree of stretchability comprised of a first rubber having halogen atoms in a molecule thereof and having unsaturated bonds in main chains, the adhesive being coated on a surface of said tape base material, said adhesive being further comprised of based on 1 part by weight rubber, 0.05 to 10 parts by weight of a second rubber having a halogen in a molecule thereof and having no unsaturated bond in the main chain and 0.1 to 3 parts by weight of a blocked polyisocyanate.

5. The adhesive tape according to claim 1, wherein: said tape base material is chloroprene rubber.

6. An adhesive tape for use with sponge rubber products, said tape comprising:
    a tape material comprised of a closed-cell chloroprene sponge rubber having stretchability, and
    an adhesive as a layer for adhering to said sponge rubber products coated on a surface of said tape base material and comprising a rubber having halogen atoms in a molecule thereof and having unsaturated bonds in main chains.

7. An adhesive tape for use in making sporting goods, such as a wet suit and a dry suit, made of a material exhibiting a relatively large degree of stretchability, which comprises:
    a tape base material comprising a closed-cell chloroprene sponge rubber having stretchability, and
    an adhesive as a layer for adhering to said material used in sporting goods, said adhesive being coated on a surface of the tape base material, and comprised of a rubber having halogen atoms in a molecule thereof and having unsaturated bonds in main chains.

8. An adhesive tape of claim 7 wherein said materials used in sporting goods are sponge rubber of chloroprene.

* * * * *